UNITED STATES PATENT OFFICE.

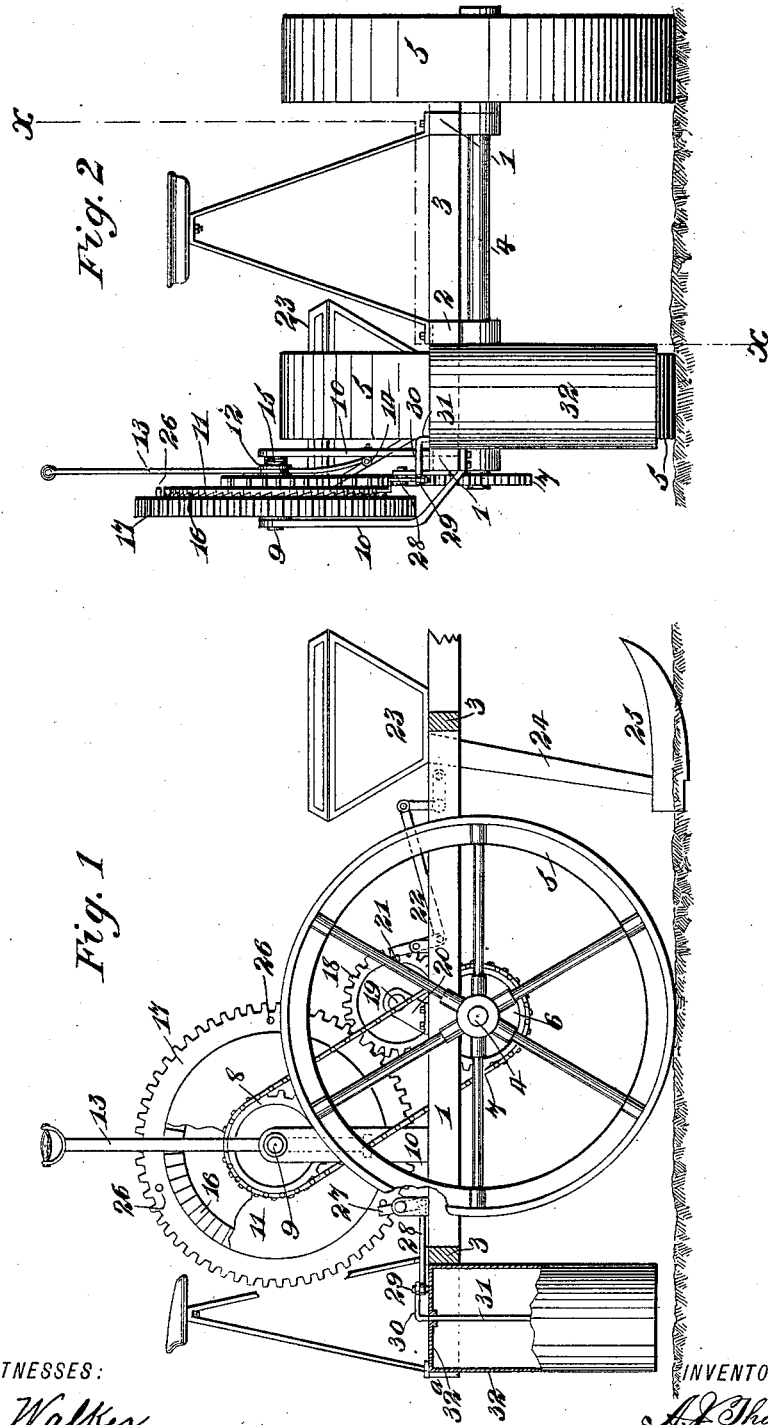

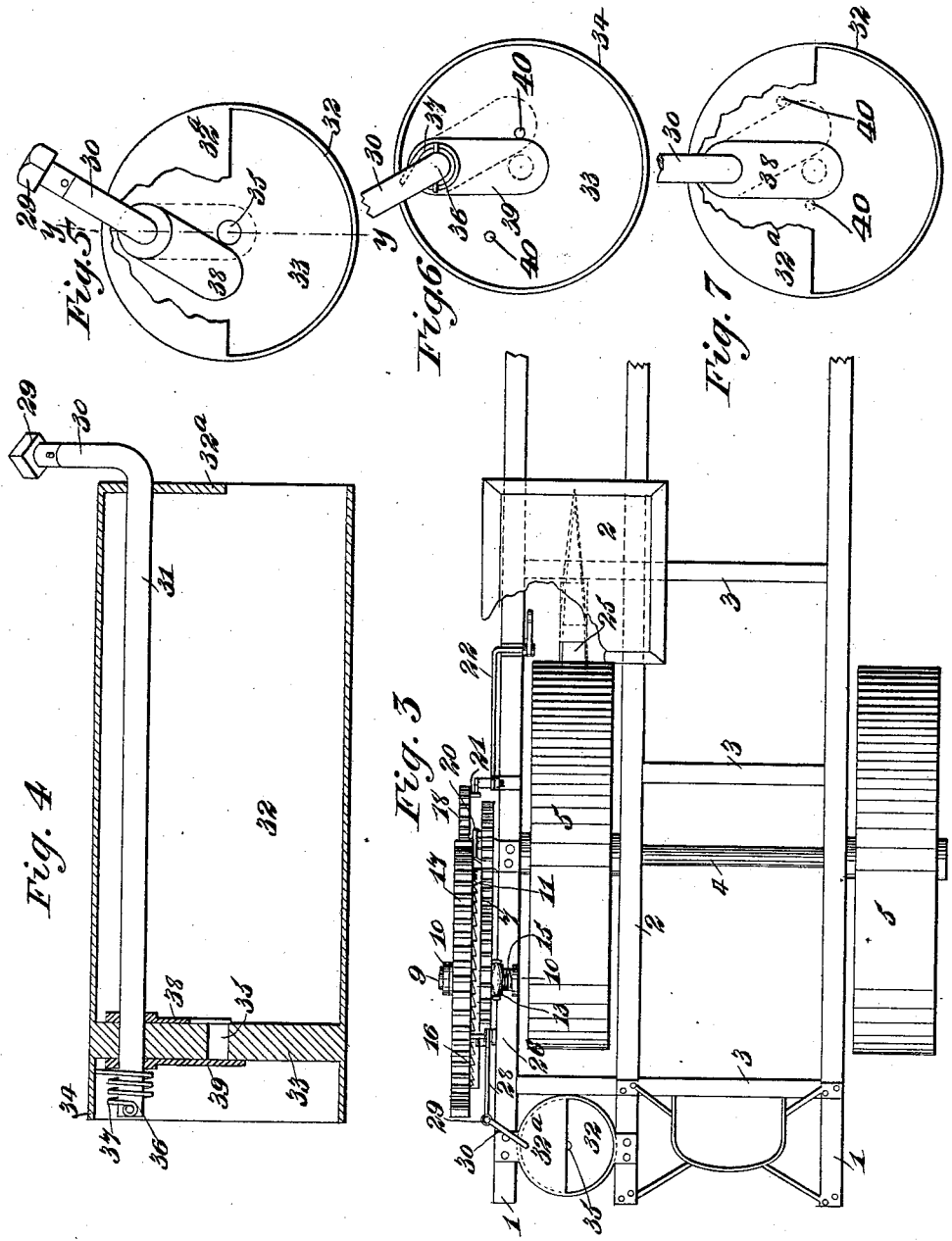

ALFRED J. THOMAS, OF CARBONDALE, KANSAS.

ATTACHMENT FOR CORN-PLANTERS.

SPECIFICATION forming part of Letters Patent No. 564,545, dated July 21, 1896.

Application filed September 10, 1895. Serial No. 562,101. (No model.)

*To all whom it may concern:*

Be it known that I, ALFRED J. THOMAS, of Carbondale, in the county of Osage and State of Kansas, have invented a new and useful Attachment for Corn-Planters, of which the following is a full, clear, and exact description.

This invention relates to certain improvements in attachments for corn-planters and the like, and has for its object to provide an attachment of this character, of a simple and inexpensive construction, adapted for use as a check-row marker and fertilizer-dropper, the marking being effected by dropping the fertilizer, which may be lime, plaster, or the like, on the hills.

The invention consists in a holder or box to contain the fertilizer, and carried on a frame attached to the axle of the planter, said box having an opening at its lower part, and being arranged behind the dropping devices, and a valve controlling said opening in the box and arranged to be actuated from the moving parts of the planter, to drop the fertilizer upon the corn from the dropping devices of the planter.

The invention also contemplates certain novel features of the construction, combination, and arrangement of the various parts of the attachment, whereby certain important advantages are attained and the device is made simpler, cheaper, and otherwise better adapted and more convenient for use than various other similar attachments heretofore employed, all as will be hereinafter fully set forth.

The novel features of the invention will be carefully defined in the claims.

Reference is to be had to the accompanying drawings, forming a part of this specification, in which similar characters of reference indicate corresponding parts in all the figures.

Figure 1 is a vertical section taken longitudinally through a planter provided with my improvements substantially in the plane indicated by the line *x x* in Fig. 2. Fig. 2 is a rear end elevation of the planter provided with my improved attachment. Fig. 3 is a plan view of the same. Fig. 4 is an axial section taken through the box of the attachment in the plane indicated by the line *y y* in Fig. 5. Fig. 5 is a view of the upper end of the fertilizer-box, a portion of the head thereof being broken away to show the upper valve at the bottom of the box in its open position. Fig. 6 is a similar view of the opposite end of the box, the lower valve being shown in its closed position; and Fig. 7 is a view similar to Fig. 5, showing the upper valve in its closed position.

The frame of the planter, which may be of any preferred construction, as herein shown comprises side bars 1 1, extending along opposite sides of the machine, and a center bar 2 parallel to and between said side bars, said bars being connected together by means of suitably-located cross-bars 3 3.

The frame is provided with a seat and draft mechanism of any preferred kind, and in it is mounted to turn a transversely-arranged axle 4, having ground-wheels 5, fixed on its opposite ends, and one end of said axle 4 is arranged to project, as seen in the drawings, and is provided with a sprocket-wheel 6, over which passes a chain or link belt 7, extending also over a similar sprocket-wheel 8, mounted on a shaft 9, carried in journal-bearings in standards 10 at one side of the frame.

The wheel 8 is formed integrally with or secured to a disk 11, having on its outer face, or that side farthest from the wheel 5, an annular series of ratchet-teeth, and said disk and wheel are longitudinally movable on said shaft 9, being provided with a collar 12, embraced by a hand-lever 13, arranged to be manipulated by the driver and pivoted at 14 to one of the standards 10.

A spring 15 serves to normally hold the sprocket-wheel 8 and disk 11 pressed to the position shown in Figs. 2 and 3, whereby the ratchet-teeth on said disk 11 are normally held in engagement with a similar annular series of ratchet-teeth 16, formed on the inner side of a large gear-wheel 17, mounted on shaft 9, and rotative independent of said sprocket-wheel and disk when the machine is backed and when necessary to take up lost motion of the ground-wheels, in which case the teeth on said disk 11 slip over the teeth 16 without imparting movement thereto, but when the planter is moving forward said wheel 17 is positively driven from the ground-wheels of the machine.

The gear-wheel 17 meshes with a small gear-wheel 18, mounted on a shaft 19 in bearings 20 on the frame, and said gear-wheel 18 has on one side a pin 21, arranged when the wheel is turned to engage one end of a lever or bar 22, connected with the arm or rocker-bar of the planter, whereby said lever is actuated to allow the corn to pass to the shoe 25 and thence to the ground.

The gear-wheel 17 is provided with a series of pins 26, arranged, when said wheel turns, to engage one end 27 of a pivoted lever, the other end of which is coupled to a link 28, extending rearwardly and coupled at its rear end by means of a coupling 29 to the upper bent end 30 of a valve lever or bar 31, extending vertically through the fertilizer-box 32, located on the frame directly behind the shoe 25, and having a cap or cover plate 32ª, extending partially over its upper end and forming a bearing in which the upper end of said rod 31 is mounted to rock.

The lower end of the box 32, which is of cylindrical form arranged in a vertical position, is closed by a bottom plate 33, below which the circular wall of the box 32 is continued, as indicated at 34 in Fig. 4, to form a skirt or housing to protect the lower valve, and said bottom 33 is provided with a central opening 35.

The lower end 36 of the rod or lever 31 extends down through the bottom 33 of the box 32 at one side thereof, and below the said bottom said rod or lever is connected to a spring 37, coiled thereon and having its end in engagement with the skirt 34, so as to hold said rod or lever, with its upper valve 38, which is located inside the box 32, normally in position to close the opening 35 in said bottom 33, and below said bottom said rod or lever is provided with a second valve 39, arranged at an angle to the upper valve 38, and adapted when moved to engage stops 40 on the bottom 33, whereby its movement and that of the rod or lever 31 is limited.

In operation, as the planter is driven along in planting the corn, the respective valves 38 and 39 are first simultaneously opened and closed, so as to permit the fertilizer in the box 32 to pass down and fill the opening 35, after which, the pin 26 having passed out of engagement with the end 27 of the pivoted lever, the spring 37 is permitted to close the upper valve 38 and open the lower valve 39 to allow the fertilizer to fall on the hill of corn just below.

The device may be adjusted by employing gears 17 and 18, of different diameters, or with differently-arranged pins to drop the fertilizer on each hill, or on alternate hills, so as to act as a check-row marker, and it will be obvious that the construction of the device as above described is of an extremely simple and effective character, and is adapted for use in connection with various forms of planter.

It will be obvious from the above description of my invention that the device is susceptible of considerable modification without material departure from the principles and spirit of my invention, and for this reason I do not wish to be understood as limiting myself to the precise form of the device herein shown in carrying my invention out in practice.

Having thus described my invention, I claim as new and desire to secure by Letters Patent—

1. In a corn-planter or the like, the combination of a wheeled frame, a shaft journaled in the frame, a large gear-wheel on said shaft, gearing comprising a clutch mechanism for driving said gear-wheel from the ground-wheels of the planter, a series of pins projecting from said gear-wheel, a small gear-wheel rotatively mounted on the frame and in mesh with said gear-wheel, a series of pins on said small gear-wheel, dropping devices at the forward part of the frame actuated from pins of the small gear-wheel, and fertilizer-dropping devices at the rear end of the frame alined with the dropping devices at the forward end thereof, and actuated from the pins on the large gear-wheel, substantially as set forth.

2. An attachment for corn-planters and the like, comprising a box of circular form having a bottom provided with an opening and arranged above its lower edge, whereby a skirt is formed depending from the lower edge of the box below the bottom thereof, a valve-rod extending through the bottom of the box and actuated from the moving parts of the planter, valves on the rod above and below the bottom and arranged at angles to each other, said valves being adapted to open and close the opening in the bottom of the box when the rod is turned, and a spring coiled on the lower end of said rod inside said skirt and having its end connected to the rod and to the box, to hold one of the valves normally closed, substantially as set forth.

ALFRED J. THOMAS.

Witnesses:
 THOS. PRITCHARD,
 WM. LOWES.